Dec. 19, 1944.   A. SILVERSTEIN ET AL   2,365,223
COOLING SYSTEM FOR AIRCRAFT
Filed Aug. 28, 1940   2 Sheets-Sheet 1
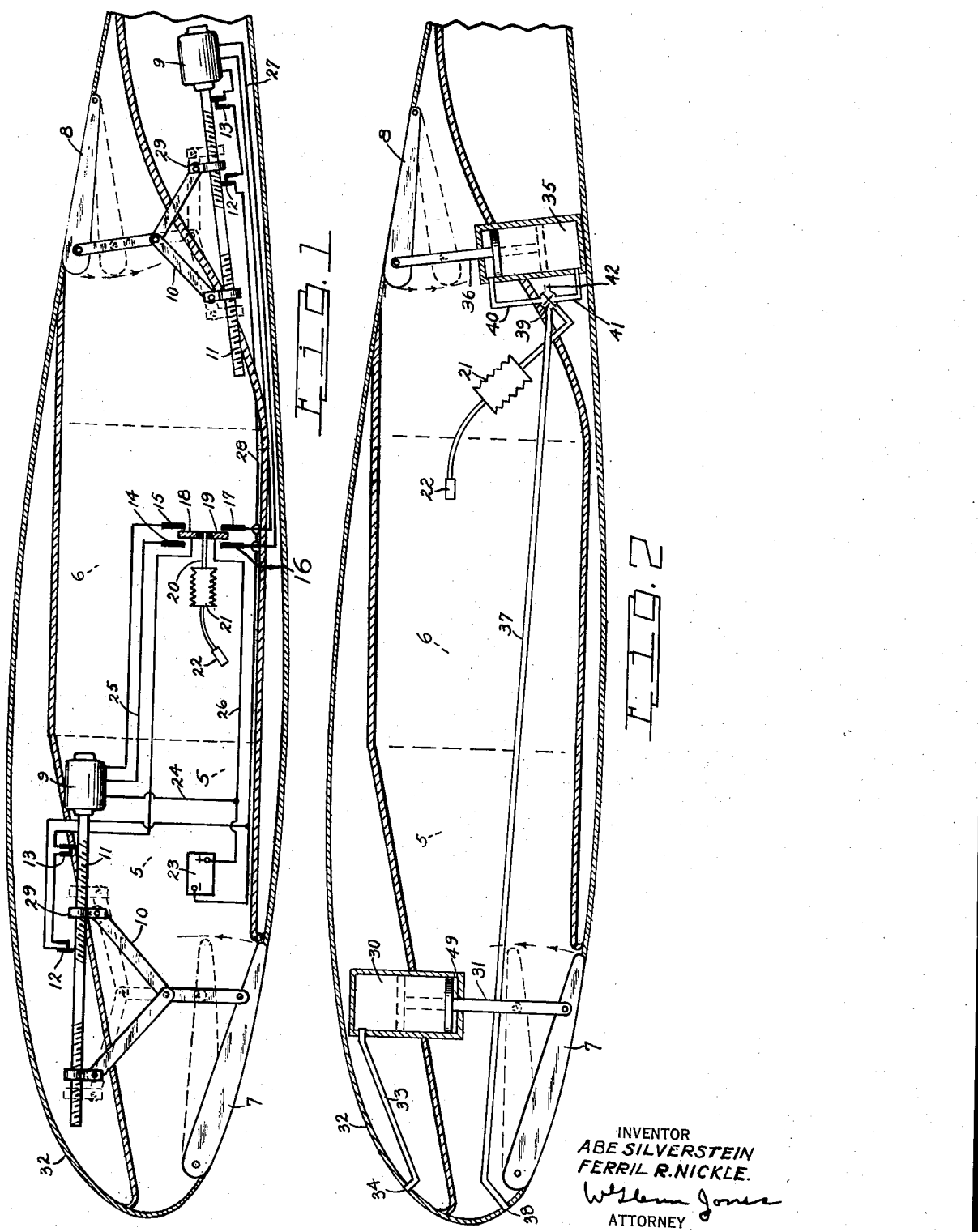
INVENTOR
ABE SILVERSTEIN
FERRIL R. NICKLE.
ATTORNEY

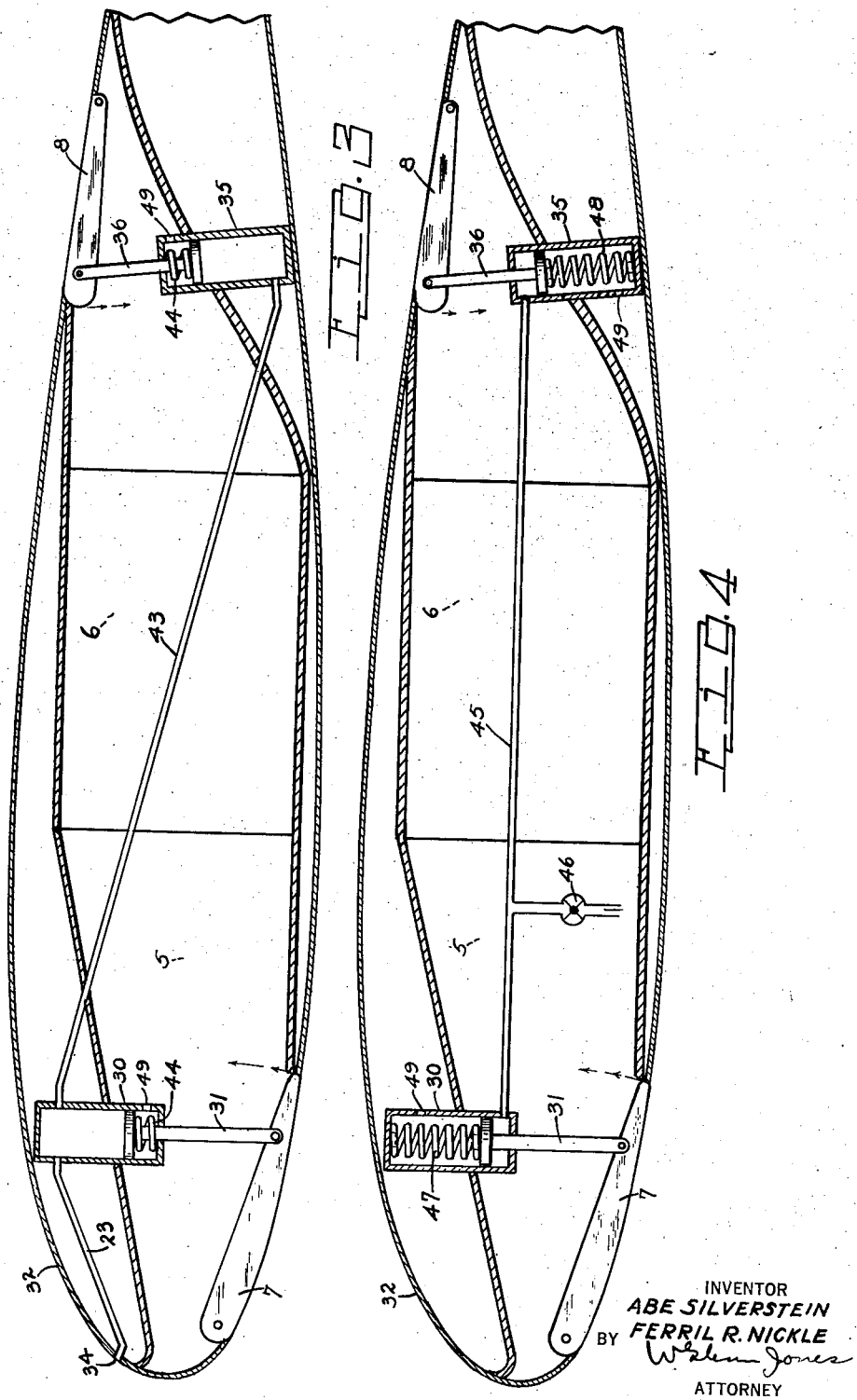

Patented Dec. 19, 1944

2,365,223

UNITED STATES PATENT OFFICE 2,365,223

COOLING SYSTEM FOR AIRCRAFT

Abe Silverstein, Hampton, Va., and Ferril R. Nickle, Mountain View, Calif.

Application August 28, 1940, Serial No. 354,472

3 Claims. (Cl. 244—53)

(Granted under the act of March 3, 1883, as amended April 30, 1928; 370 O. G. 757)

The invention relates broadly to a cooling system for aircraft, and more particularly to the cooling of aircraft engines that are contained wholly within the aircraft wing, and/or of such other objects as may be desired.

An object of the invention is to utilize the air pressures over an aircraft wing surface to provide a flow of air through the wing for cooling or ventilating purposes.

Another object of the invention is to regulate the flow of air through ducts in an aircraft wing by the use of dampers or flaps placed at convenient places along the wing surface, at which points airflow through the wing will occur, the flaps being either automatically or manually controlled.

With the above and other objects in view the invention consists in the construction, combination and arrangement of parts as will be described more fully hereinafter.

Reference is to be had to the accompanying drawings forming a part of this specification and in which like reference characters indicate corresponding parts throughout the several views, and in which Fig. 1 is a cross-section of an aircraft wing showing an electrically controlled flap operating mechanism installed therein, Fig. 2 is a similar view showing a flap operating mechanism controlled by a change in angle of attack, Fig. 3 is a similar view showing a flap operating mechanism controlled by a change in air pressure at the leading edge of the wing, and Fig. 4 is a similar view showing a mechanism for operating the flaps from a source of constant air pressure located within the airplane.

In general, the invention consists of an air duct or ducts extending through an aircraft wing and so arranged that the air coursing therethrough will surround an object to be cooled. The airflow is regulated by flaps placed at inlet and at outlet ports of the duct, which ports may be arranged at convenient positions along the wing surface. The flaps themselves are controlled through a mechanism either electrically, thermally or manually operated.

Referring more particularly to Fig. 1 of the drawings, a duct 5, extending from the leading edge to near the trailing edge of the aircraft and having its inlet desirably located on the underside of the wing and its outlet on the topside of the wing, permits the incoming airflow to pass around and cool an object 6 placed in the duct. The airflow through the inlet is regulated by a flap 7 and the airflow through the outlet is regulated by a flap 8, each flap having a pivotal connection with the adjacent wing structure so as to open inwardly, as shown by dotted lines. The flaps are controlled by motors 9 through toggle members 10 operable on threaded shafts 11 of the motors.

The motors 9 may be of the multiple-winding type in which one winding serves to cause rotation of the motor in one direction and the other winding to impart movement to the motor armature in the reverse direction. Limit switches 12 and 13 associated with each of the motors 9 serve to deenergize the motors when the flaps have moved to the desired position. The circuits for causing energization of the motors are controlled by a master switch which includes a pair of stationary upper contacts 14 and 15 and a similar pair of lower contacts 16 and 17. Contacts 14 and 16 or contacts 15 and 17 are arranged for simultaneous engagement by contacts 18 and 19 respectively, which are insulated from each other and from the supporting shaft 20 which is actuated by a Sylphon device 21 that is responsive to temperature changes, or that may be manually actuated by a hand piece 22.

If the Sylphon device causes the contacts 18 and 19 to move into engagement with the respective stationary contacts 14 and 16, both motors will be simultaneously energized to cause movement of the armatures thereof in the same direction. Thus, the circuit for the motor actuating the flap 7 will extend from the positive terminal of a source of electromotive force 23 through conductor 24 to one of the windings of the motors 9, from thence, by means of the conductor 25, to the contacts 14 and 18, and from thence through the limit switches 12 and 13 which are connected to the other terminal of the source of electromotive force.

The circuit to the motor actuating flap 8 extends from the positive terminal of the source of electromotive force 23 by means of the conductor 26 to the engaged contacts 16 and 19 and from thence via the conductor 27 to one of the windings of the motor, thence through the limit switches 12 and 13 and back to the other terminal of the source of electromotive force through the conductor 28.

By closure of the circuits of the motors 9 it is clear that they are simultaneously energized for rotation in the same direction, thus causing simultaneous movement of the front and rear flaps to their desired positions. When these positions are attained, nut 29 threadedly engaging the shaft of each motor and disposed intermediate the limit switches 12 and 13 will move to engage one of the limit switches, thereby interrupting the motor circuits heretofore described with consequent de-energization of the prime movers.

When, now, the Sylphon device causes the contacts 18 and 19 to engage the stationary contacts 15 and 17, respectively, the other winding of each of the motors will be energized, thereby causing rotation of the motor armatures in the reverse direction with consequent movement of the flaps in opposite directions. The circuits now closed, which serve to energize the motors, are believed to be self-evident from the description heretofore made, it being clear, however, that the other of the limit switches of each pair associated with each motor will not ultimately be opened to thus insure a predetermined movement of each flap.

Although the drawings illustrate but one source of electromotive force and one Sylphon, it is to be understood that the motor drives may be operated from individual electric sources, or by individual Sylphons.

In Fig. 2 there is shown a mechanism whereby the forward or inlet flap 7 is operated automatically by change in angle of attack of the aircraft, and the rear or outlet flap 8 is operated either by a thermal or manual control of a valve which regulates the airflow into a cylinder, the piston of which is connected to flap 8.

More in detail, a cylinder 30 having a piston 31 therein is mounted adjacent the leading edge 32 of the wing, the piston having a pivotal connection with the flap 7. The interior of the cylinder has communication with the atmosphere through a conduit 33 terminating in a pressure orifice 34 located at a predetermined point on the leading edge of the wing so selected that the orifice is under a high pressure only when the wing is in a normal level flight, but as the angle of attack is increased, as in climbing or under an increase in the load, in which case the lower pressure area on top of the wing moves forward and over what was the upper portion of the forward edge of the wing, the orifice will find itself under a much lower pressure depending on the degree of the angle of attack and hence the shift of the lower pressure area. As the angle of attack is increased or decreased, as the case may be, the air pressure at the orifice 34 becomes positive or negative with respect to atmospheric pressure. A positive pressure exerts a force upon the top of the piston 31 causing it to close the flap 7, and when the angle of attack is increased a suction is created at the orifice which tends to draw the piston to the other end of its stroke, thus opening the flap. This action by the suction on the piston is assisted by the increased air pressure on the under side of the wing directly against the flap.

The rear or outlet flap 8, positioned at a point where the air pressure is lower than that at the inlet of the duct, may also be controlled automatically in a manner similar to that of the flap 7. However, we have shown in Fig. 2 of the drawings a manual or a Sylphon control for the flap. A cylinder 35 containing a piston 36 pivotally connected to the flap 8, has communication with the atmosphere through a conduit 37 having its intake 38 at a point on the leading edge preferably below the mean line of the airfoil profile. The air incoming through this conduit is directed to the desired side of piston 36 by a suitable valve 39 adapted to open either of the branch conduits 40 or 41 leading into opposite ends of the cylinder 35. The airflow into the cylinder through the valve 39 may be controlled either thermally or manually. If thermal control is desired, the Sylphon device 21 is connected into the cooling system so that when the temperature of the coolant is too high, the Sylphon will operate to move the valve 39 so that the airflow will be through the branch conduit 40 to the top of the piston 36 opening the flap 8, thus permitting a greater flow of cooling air through the wing. When the temperature again reaches the desired point, the Sylphon will operate in a reverse direction closing conduit 40 and opening conduit 41 to the lower end of the cylinder moving the piston to the other end of its stroke closing the flap. The valve 39 should be such that air collected in the idle end of the cylinder will escape through the valve and outlet 42. As previously stated, manual operation of the valve 39 is effected through the hand piece 22 attached to the Sylphon.

The inlet flap 7 also may be controlled through the agency of a Sylphon, similar to that for outlet flap 8, or both the inlet flap and the outlet flap may be interconnected, both utilizing the same Sylphon.

In the system shown in Fig. 3 both the inlet flap 7 and the outlet flap 8 are operated by a change in pressure due to a change in angle of attack of the airplane; that is to say, when the pressure at the orifice 34 reverses from positive to negative, both flaps will open to allow a greater flow of cooling air through the wing. The angle of attack at which the flaps will open will lie between the angle of attack for high speed of the airplane and for climb.

The flaps 7 and 8 are connected to pistons 31 and 36 operable in cylinders 30 and 35 respectively. Cylinder 31 is connected to atmosphere by conduit 33, as in the construction shown in Fig. 2, and cylinder 35 is connected to cylinder 30 by a conduit 43 which has its emission ends in the cylinders at the side of the piston away from its respective flap. Thus, as the pressure builds up in cylinder 30 it will pass into cylinder 35, opening flap 8 simultaneously with flap 7. Buffer springs 44 are mounted in the cylinders to absorb shock when the piston reaches the end of its opening stroke.

It might be desirable at times to have the actuating force to open the flaps come from a source other than from the wing surface. Such a system is illustrated in Fig. 4, wherein the cylinders 30 and 35 are connected to a constant source of pressure (not shown) by a common conduit 45 in which a suitable valve 46 is inserted to control the airflow through the conduit, and to allow escape of the air in the cylinders when the flaps are being closed. This valve may be operated by either thermal or manual control as already explained in connection with the other systems. Springs 47 and 48 in the respective cylinders assist in closing the flaps when the airflow is disrupted.

Although no mention has been made of a bleed opening in the cylinders, other than in the valve 39, it will be understood that one is suitably placed in each cylinder to allow the escape of air trapped by the piston in its reciprocal movement, such bleed valve being indicated at 49 in the various views of the drawings.

It will be understood that the above description and accompanying drawings comprehend only the general and preferred embodiment of our invention and that various changes in details of construction, proportion and arrangement of parts may be made within the scope of the appended claims and without sacrificing any of the advantages of our invention.

The invention described herein may be manufactured and/or used by or for the Government of the United States of America for governmental purposes without the payment of any royalties thereon or therefor.

What we claim as new is:

1. In a cooling system for objects contained within an airplane wing, a duct extending through the wing for the transfer of a coolant therethrough, pivotal closures at the inlet and the outlet of the duct for regulating the flow of the coolant, a piston operable within a cylinder and controllable by changes in aerodynamic pressure at the leading edge of the wing for actuating the inlet closure, a piston operable within a cylinder for actuating the outlet closure, said latter piston being motivated by aerodynamic pressure at the leading edge of the wing, and a Sylphon influenced by changes in temperature in the duct for directing said pressure to either side of the piston to actuate the outlet closure independently of the inlet closure.

2. In a cooling system for objects contained within an airplane wing, a duct extending through the wing for transfer of a coolant therethrough, pivotal closures at the front and rear ends of the duct, pneumatic power means for actuating each of said closures, means for supplying air under pressure to said pneumatic means including inlet openings in the leading edge of the wing, the force of the power means for the front closure being balanced by the dynamic pressure on the said closure, and temperature responsive control means for the air supply means to the rear power means for actuating the rear closure in either direction.

3. In a cooling system for objects contained within an airplane wing, a duct extending through the wing for transfer of a coolant therethrough, closures for said duct for regulating the flow of the coolant, cylinders having pistons pivotally connected to said closures, a common air pressure supply means for said cylinders connected to an opening in the leading edge of the wing for regulating said closures in accordance with the dynamic pressures on the closures and at the leading edge.

ABE SILVERSTEIN.
FERRIL R. NICKLE.